Patented July 30, 1935

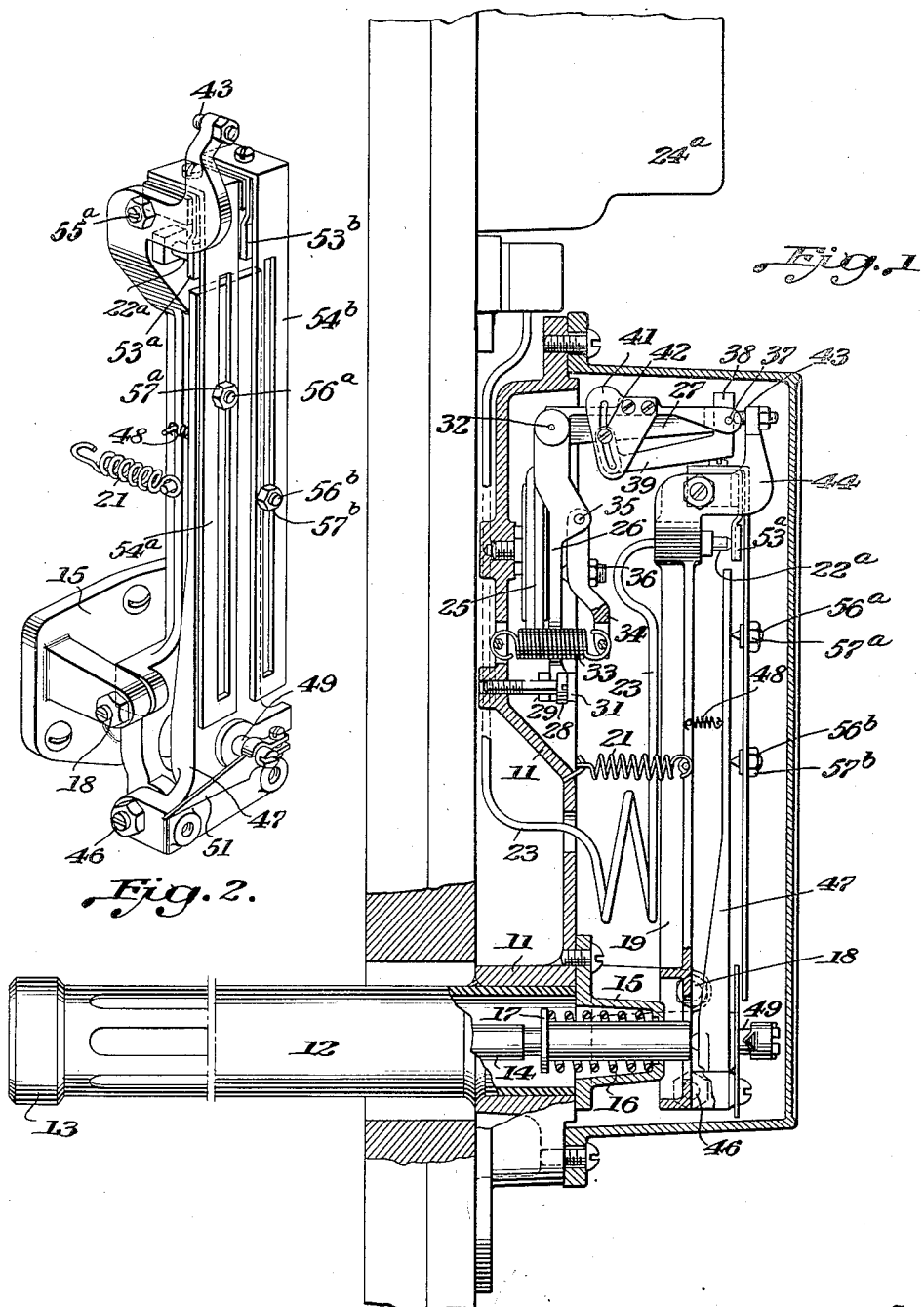

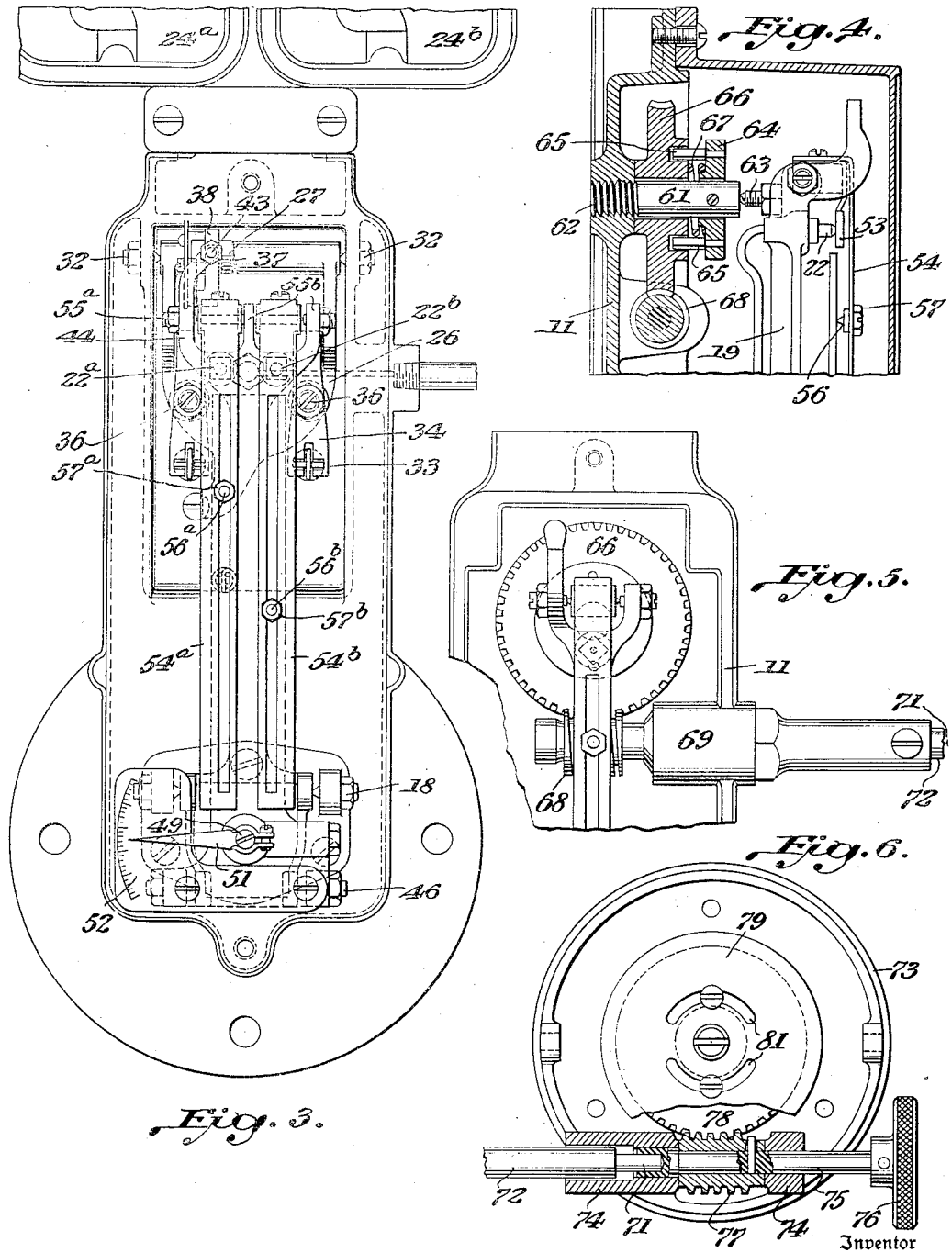

2,009,675

UNITED STATES PATENT OFFICE 2,009,675

THERMOSTAT AND LIKE DEVICE

Arthur J. Otto, Milwaukee, Wis., assignor to Johnson Service Company, Milwaukee, Wis., a corporation of Wisconsin Application September 1, 1934, Serial No. 742,494

9 Claims. (Cl. 236—82)

This invention relates to automatic control devices responsive to variable physical conditions, such as temperature, humidity, pressure and the like.

The invention is applicable to thermostats, hygrostats, pressure responsive controllers and the like, by the simple substitution of known elements responsive to corresponding variables, but will be here described as embodied in a thermostat, this being a typical example and a device of extensive utility.

In the patent to Otto, et al. 1,500,260, July 8, 1924, is disclosed a progressive thermostat or like device of the pneumatic relay type. This functions to establish in a branch line, connected to some controlled device (such as a heater valve or damper motor, for example), a pressure which varies progressively in response to variable throttling of a leak port by the thermostatic element.

The present invention contemplates means to adjust the rate of change of throttling as compared to the rate of change of temperature, temperature being the controlling variable in the case of a thermostat. Thus the pressure in the branch line may be caused to change by any desired amount (within practicable limits) per degree change of temperature. An important point is that this adjustment does not affect the temperatures at which the leak port is completely closed.

It is commonly desirable to regulate two different devices in response to the indications of a single responsive element. For example, one thermostatic element may control two relays, one having its branch line connected to a device such as a heat controlling valve motor, and the other having its branch line connected to a different device, such as a damper motor. The operative characteristics of such motors may be quite diverse, and the invention permits such control of the rate of throttling for each relay, as to meet the particular pressure characteristics of each motor by a simple adjustment effected between the thermostatic element and the corresponding throttling means.

The desired result is secured by interposing a motion ratio changing adjustment between the thermostatic element and each of the throttling means, such adjustment being effective to vary the rate of change of throttling per degree of temperature change without affecting the temperature at which the leak port is completely closed.

Another feature of the invention is the provision of means for adjusting the critical temperature of response of the instrument (leak port just closed) either at the instrument by one means, or from a remote point by another means. Two remote adjusting means, one mechanical and the other pneumatic are disclosed, and one or the other may be adopted as circumstances may dictate.

Several embodiments of the broad inventive principle will now be described with reference to the accompanying drawings, in which:—

Fig. 1 is a vertical axial section through an instrument in which a single thermostatic element operates two leak-port controlling valves through separate operating connections, each adjustable independently to vary the rate of motion of the valves per unit change of temperature. The device includes a remote adjustment of the fluid pressure operated type.

Fig. 2 is a perspective view of the valve actuating mechanism including the first-named adjusting means.

Fig. 3 is a front elevation of the instrument shown in Fig. 1, with the cover removed.

Fig. 4 is a fragmentary view similar to the upper portion of Fig. 1, showing a single leak port instrument having a remote adjustment of the mechanical type.

Fig. 5 is a view similar to the upper portion of Fig. 3 but showing the device of Fig. 4 with the cover removed.

Fig. 6 is a front elevation, partly in section, showing manually operated member of the mechanical remote adjustment.

Refer first to Figs. 1–3.

Supported by a base 11, which also supports the valve mechanism, is a thermostatic couple made up of the relatively expansible tube 12, fixed at one end in base 11, and capped at the other end at 13, and a relatively inexpansible rod 14.

The forward end of rod 14 is guided by the member 15 through which it may slide longitudinally as member 12 expands and contracts with temperature changes. A compression spring 16 reacts against collar 17 to hold the rear end of rod 14 against cap 13.

Pivoted at 18 on member 15 is a yoke or lever 19, drawn toward base 11 by a coil tension spring 21. Member 19 carries two leak ports 22a and 22b, each connected by a corresponding flexible tube, one of which appears at 23, in Fig. 1, with the control chamber of a corresponding relay 24a or 24b. These relays may be of the type shown in the Otto patent, above identified, omitting, of course, the leak port and thermostatic bar included in the patent drawing.

The member 19 moves only to effect an adjustment of the temperature of initial response of the instrument (leak port just closed) and this adjustment is effected by a pneumatically shiftable cam.

The pneumatic motor which shifts the adjusting cam is the diaphragm cell 25 to and from which pressure fluid is admitted and exhausted by any suitable means. The cell is carried by base 11 and reacts against a plate 26 forming one arm of a bell crank, the other arm of which appears at 27. The motion of plate 26 in both directions is limited by a stop screw 28, which may be turned to adjust the position of its head. The head coacts with spaced lugs 29 and 31 on plate 26. The bell crank is pivoted at 32 and its plate 26 is drawn toward frame 11 by two tension springs 33, each attached at one end to base 11 and at the other to a corresponding arm 34 pivoted at 35 to plate 26. Thrust screws 36 permit adjustments of spring tension.

Arm 27 carries pivoted to it at 37 a cam block 38. By tilting block 38 on pivot 37, the obliquity of its cam face to the path of pivot 37 may be varied and this adjustment is fixed by clamping an arm 39, integral with block 38, in the slot in sector plate 41 by means of screw 42. The front or cam face of block 38 reacts against thrust screw 43 which is mounted in a lug 44 carried by member 19.

Screw 28 and lugs 29 and 31 limit the motion of the bell crank, but the obliquity of the cam face of block 38 determines how far member 19 will be caused to shift by such motion of the bell crank.

Pivoted at 46 on member 19 is a wide lever 47 flat on its forward face. Lever 47 is drawn toward member 19 by a light tension spring 48, and carries a thrust screw 49 which engages the end of rod 14. A pointer 51 and dial 52 indicate the adjustment of screw 49.

The leak ports 22a, 22b, respectively, are controlled by corresponding valves or lids 53a and 53b. The lid 53a with an attached longitudinally slotted lever 54a is pivoted at 55a on member 19. Similarly lid 53b with attached slotted lever 54b is pivoted on member 19 at 55b.

Mounted in the slot in lever 54a is a thrust pin 56a adjustable lengthwise of the slot and clamped in adjusted positions by nut 57a. This pin serves as a thrust connection between the front face of lever 47 and lever 54a.

A similar pin 56b and nut 57b provide an adjustable thrust connection for lever 54b.

The parts are preferably so arranged and adjusted that when the thermostat causes lids 53a, 53b to close, the leak port levers 54a, 54b are parallel with the front face of lever 47. Under such conditions adjustment of the thrust pins lengthwise of the slots will change the rate of throttling by changing the leverage ratio without changing the critical temperature of response of the instrument.

Figs. 4 and 5 show a modified form of the device. The parts 11 to 18 are essentially unchanged and the parts mounted on member 19 are essentially unchanged except a single leak port 22 with lid 53, slotted lever 54, thrust pin 56 and nut 57 is used instead of the two shown in Figs. 1 to 3. The number of leak ports and associated parts is determined by the use to be made of the instrument, and any reasonable number may be used.

The means for adjusting member 19 are changed, the expansible cell 25 and bell crank 26, 27, and the parts carried thereby, being dispensed with in favor of an adjusting screw operable from a remote point by turning a flexible shaft.

The adjusting member 61 is threaded at 62 in base 11 and its end engages a thrust screw 63 mounted in member 19. Screw 63 may be used to "zero" the device. Pinned to member 61 is a hub 64 having a plurality of fingers 65 which engage holes in a worm wheel 66 slidable axially on member 61. The fingers 65 thus perform the functions of splines and cause the member 61 and wheel 66 to turn together while the member 61 moves axially because of its threaded mounting at 62. A compression spring 67 presses the wheel toward base 11.

A worm 68 swiveled at 69 on base 11 and driven from a remote point by a flexible shaft 71, serves as means to turn wheel 66 slowly in either direction. Shaft 71 turns in a flexible sheath 72.

To drive shaft 71 and indicate its position, the construction shown in Fig. 6 may be used. A base 73 has lugs 74 in which a spindle 75 having a knurled head 76, is swiveled. Spindle 75 is fast to the end of flexible shaft 71.

Pinned on spindle 75 between lugs 74 is a worm 77 which drives a worm wheel 78. Mounted on the face of wheel 78 is a dial 79 which may be provided with any suitable indicia. The arcuate slots 81 and clamp screws permit the dial to be zeroed.

The operation of the device will be clear from the above description. The temperature of response can be adjusted by means of the screw 49 which changes the relation of lever 47 to rod 14, or by shifting member 19 by whichever remote adjusting means is adopted.

The rate of motion of individual leak port lids, and consequently the rate of change of branch line pressure per degree change of temperature is changed by shifting the thrust pins in their respective slotted levers.

What is claimed is,—

1. The combination of a plurality of fluid pressure relays each of the type adapted to establish in a corresponding branch line a pressure which varies in response to variable throttling of a leak port forming part of the relay; independent throttling means for the respective leak ports; a responsive element; a lever arranged to be moved by the response of said element, said lever being mounted on a fulcrum; a plurality of fulcrumed levers each arranged to actuate a corresponding one of said throttling means, said independent levers, on the one hand, and the first-named lever on the other hand, projecting from their fulcra into overlapping relation with each other; independent driving connections between the first-named lever, on the one hand, and each of said independent levers on the other hand; and means for adjusting each of said driving connections independently of the other in the direction of the length of their respective levers.

2. The combination of a leak port; means for variably throttling the same; a responsive element; a lever; an adjustable driving connection between said responsive element and said lever; a second lever connected to actuate said throttling means and overlapping the first lever, said levers projecting toward each other from their respective fulcra; a driving connection between said levers adjustable in the direction of the lengths thereof; and means for adjusting the position of the leak port, said means comprising a pressure motor, a member arranged to be shifted by the actuation of said motor having a cam arranged to shift said leak port, and means for defining the range of motion of the motor.

3. The combination defined in claim 2, further characterized in that the cam is adjustable to modify its displacing action.

4. The combination of a leak port; means for variably throttling the same; a responsive element; a lever; an adjustable driving connection between said responsive element and said lever; a second lever connected to actuate said throttling means and overlapping the first lever, said levers projecting toward each other from their respective fulcra; a driving connection between said levers adjustable in the direction of the lengths thereof; and means for adjusting the position of the leak port, said means comprising a threaded stop, and means for rotating said stop comprising a rotary flexible shaft, and gearing between said shaft and said threaded stop.

5. The combination of a fluid pressure relay adapted to be controlled by variable throttling of a leak port forming part of the relay; valve means for variably throttling said leak port; a responsive element; a lever mechanism interposed between said responsive element and said valve means; two independent adjusting means, one of which varies the relation of said lever mechanism with said responsive element, and the other of which varies the motion leverage ratio of said lever mechanism; and means operable from a remote point for varying the position of said leak port whereby its coaction with said valve means is modified.

6. In a responsive device, the combination of a responsive element; a leak port; a valve mechanism controlling said leak port; a lever mechanism interposed between said responsive element and said valve mechanism; and three independent adjusting means, one of which is local to the instrument and varies the relation of the responsive element to said lever mechanism, the second of which is operable from a remote point and varises the position of said leak port relatively to said valve means, and the third of which varies the motion ratio of said lever mechanism.

7. The combination of a responsive element; a leak port; valve means controlling said leak port; a lever mechanism interposed between said responsive element and said valve means; and three independent adjusting means, one of which varies the motion ratio of said lever mechanism to vary the rate of change of throttling with reference to the rate of response of the responsive element, and the other two adjusting means effecting the critical point of response, one of said adjusting means being local to the instrument and the other operable from a remote point.

8. The combination of a responsive element; a plurality of leak ports; a plurality of valves controlling said leak ports; and independently adjustable variable ratio lever mechanisms interposed between said responsive element on the one hand and respective valve means on the other.

9. The combination of a responsive element; a plurality of leak ports; a plurality of valves controlling said leak ports; independently adjustable variable ratio lever mechanisms interposed between said responsive element on the one hand and respective valve means on the other; and two adjusting means, one interposed between said responsive element and said lever mechanisms, and the other serving to adjust the position of all said leak ports simultaneously.

ARTHUR J. OTTO.